US008622230B2

(12) United States Patent
Grissom

(10) Patent No.: US 8,622,230 B2
(45) Date of Patent: Jan. 7, 2014

(54) RESEALABLE CONTAINER HAVING FRANGIBLE PORTION AND HINGED TOP

(76) Inventor: Michael D Grissom, Morrisville, NC (US)

( * ) Notice: Subject to any disclaimer, the term of this patent is extended or adjusted under 35 U.S.C. 154(b) by 0 days.

(21) Appl. No.: 13/477,984

(22) Filed: May 22, 2012

(65) Prior Publication Data

US 2012/0228294 A1     Sep. 13, 2012

Related U.S. Application Data

(63) Continuation-in-part of application No. 12/195,372, filed on Aug. 20, 2008, now Pat. No. 8,215,513.

(51) Int. Cl.
*B65D 17/32*     (2006.01)
*B65D 41/32*     (2006.01)
*B65D 51/18*     (2006.01)

(52) U.S. Cl.
USPC ......... 220/268; 220/254.3; 220/266; 220/906

(58) Field of Classification Search
USPC ......... 220/268, 213, 825, 810, 269, 263, 264, 220/906, 266, 254.1, 254.3, 256.1, 257.1, 220/615, 610, 847, 845, 619, 254.5; 413/2, 413/12

See application file for complete search history.

(56) References Cited

U.S. PATENT DOCUMENTS

| | | | | |
|---|---|---|---|---|
| 2,110,058 A | * | 3/1938 | Baron | 222/470 |
| 3,015,411 A | * | 1/1962 | Smith | 220/714 |
| 3,197,059 A | * | 7/1965 | Anderson | 220/266 |
| 3,972,443 A | * | 8/1976 | Albert | 220/715 |
| 4,303,173 A | * | 12/1981 | Nergard | 220/254.5 |
| 5,810,189 A | * | 9/1998 | Baker | 220/257.2 |

* cited by examiner

*Primary Examiner* — Andrew Perreault
(74) *Attorney, Agent, or Firm* — David L. Banner

(57) ABSTRACT

A light weight hinged top (top) is described to be used as a container top. This particular model provides ease of use and requires significantly less material for manufacturing. A novel way of connecting the top and the container is using a fork spring which has three fingers like structures. The two outer structures are smaller than the middle one. The fork spring due to its resiliency brings the container top back to closing position thus providing self closing and self reseal ability for the top. A guide member also helps to position the top when it opens and closes. The top can be made using metal, biodegradable materials or any flexible material. The top can be used for cans or bottles.

14 Claims, 12 Drawing Sheets

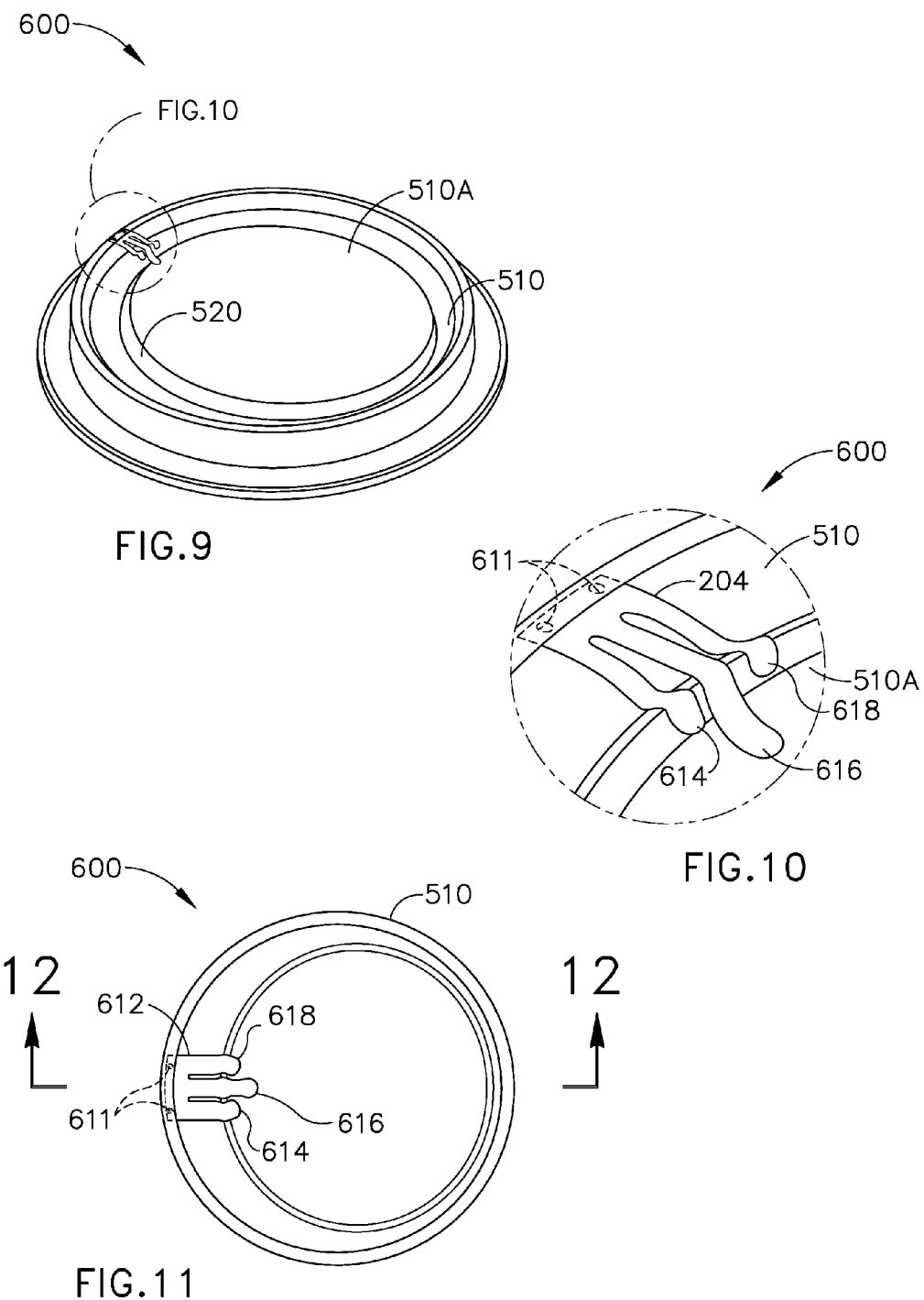

RESEALABLE CONTAINER HAVING FRANGIBLE PORTION AND HINGED TOP

CROSS REFERENCE TO RELATED APPLICATION

This application is a continuation-in-part of the U.S. patent application Ser. No. 12/195,372, filed on Aug. 20, 2008 now U.S. Pat. No. 8,215,513. The U.S. patent application Ser. No. 12/195,372 is hereby incorporated by reference in its entirety for all of its teachings.

FIELD OF TECHNOLOGY

This disclosure relates generally to a light weight hinged top product that has self sealing quality and method of using the product as a container top. More specifically, this disclosure relates to using a hinged self sealing container top to prevent spillage, increase storage and use less metal to make the product.

BACKGROUND

The current market provides containers with hard top cap enclosure with an opening mechanism. Some cans once they are opened have to be consumed fully or stored in a separate container. The other tops used for bottles and cans do not provide the resealing opportunity. They are also very process intensive to make. In order to save process time, use of excessive and expensive metals, there is need to find a process that is easier and user friendly.

SUMMARY

The instant disclosure describes a low weight hinged top for a container as a product and method of using the product. In one embodiment, the container has a peripheral seam that is folded to receive the light weight hinged top and to cover the aperture of the container. In another embodiment, the peripheral seam connects with the light weight hinged top through a fork spring and a guide member. In another embodiment, the guide member enables the container and the light weight hinged top to be connected once the light weight hinged top is open. The guide member also helps realign, reclose and reseal when the pressure inside the can increases and the light weight hinged top is pushed upwards.

In one embodiment, the light weight hinged top is at least one of a one part top and/or two part top. In one embodiment, the two part top comprises of a panel and the dome top that can be used to seal a container filled with liquid, solid and semi-solid materials. In another embodiment, the light weight hinged top may comprise only of two part top that has no panel. In one embodiment, material that is being used to make light weight hinged top is biodegradable, synthetic (light weight hinged top for a container and container top are interchangeably used throughout the instant application). In one preferred embodiment, the light weight hinged top can be made up of aluminum and use 60-85% less aluminum than currently being used by the industry. In one embodiment, the container top should be able to withstand 40-95 PSI pressure to maintain its structural integrity.

In one embodiment, the use of less material may be accomplished by reducing the size of the light weight hinged top in the two part and/or the one part design. In another embodiment, the use of less material may be achieved for the two part and/or the one part design by eliminating the opening tab currently used by the industry.

In one embodiment, a guide member is incorporated to provide structural integrity to the junction and provide guidance for the fork spring and the convex fold of the two part top to open and close properly. In another embodiment, the panel may be offset on one side from the peripheral seam of the container. The guide member may be longer on this side than the side where there is no offset. In another embodiment, the panel may be close to the peripheral seam without any offset on any side. The guide member in this case may be equal in length on both sides.

In one embodiment, as an improvement to the pending U.S. patent application Ser. No. 12/195,372 a fork spring is used as a hinge to help keep the low weight hinged top in place. In another embodiment, the fork spring has three finger like structures. Two of the outside finger like structures on the outside is of equal length and the middle finger like structure is longer than the two outside finger like structures. In one embodiment, the fork spring has a convex fold on the fingers to receive the convex fold of the side for the one part top or the two part top. In one embodiment, the fork spring enables attachment, correct alignment and positioning of the dome top's sides relative to the peripheral seam for the container top and convex fold for the one part top and/or the two part top. In another embodiment, the fork spring prevents the dome top from completely separating from the panel. In another embodiment, when the user uses pressure to open the container from the top, the two part top separates from the peripheral seam of the container and is held in place by a fork spring. In another embodiment, the guide member helps guides the two part top and the peripheral seam to be in correct alignment.

In one embodiment, the two part top may comprise of a panel with an aperture and a dome top. In another embodiment, the two part top may comprise of just the dome top. In one embodiment, the dome top is convex in the center and on the two ends folds into a convex fold to receive a guide member and sit on the convex finger bend of the fork spring. In another embodiment, a fork spring forms a hinge to hold the dome top to the peripheral seam. In another embodiment, the fork spring may also be attached to the panel. In one embodiment, the peripheral seam of the container and the two part top come together to form a junction.

In one embodiment, the one part top comprises of a peripheral seamed panel with a two-fold separable seam designed as an inverted flange that integrates the dome top to the peripheral seam of the container. In one embodiment, one part top has a tear line that joins the one part top and the peripheral seam and helps seal the container. In one embodiment, the one part top is made up of two components a dome top and inverted flange that make up the separable seam. In one embodiment, the two-fold separable seam comprises of a curved lip. The curved lip helps create a weakened indentation for the inverted flange to open the dome top. The one part top separates from the container peripheral seam using a tear line and helps seal/reclose and leak proof the contents of the can once it is in closed position.

The method of using, in one embodiment is by sealing the container using the light weight hinged top. In another embodiment, a user if they need to open they will simply press on the center of the light weight hinged top downwards. The pressure, in one embodiment, separates the light weight hinged top from the peripheral seam of the container top for two part top or the one part top. The tear line in one part top, in one embodiment, around the dome top periphery is broken and the dome top separates from the panel completely. In one part top the mechanism is a bit different. In one embodiment, to open the two part top pressure is applied in the center. The guide member is loosened from the fork spring convex flange and the convex fold of the two part top. The second side of the dome top is released and the first side of the dome top is still attached to the fork spring. The only physical connection, in one embodiment, that the dome top has is with the fork spring after is has been opened. The fork spring keeps the dome top in place and helps to bring it back up when the pressure from within raises the dome top to the mating surface. Once the dome top is in position the one part top and/or the two part top using the fork spring become flush with the container peripheral folded seam the can is resealed.

In one embodiment, a lip actuated self closing light weight hinged top is disclosed. The light weight hinged top may also perform a function of self closing because of the fork spring attachment.

A novel product for closing a container using a light weight hinged top and the method of using the said product, disclosed herein, may be implemented in any means for achieving various aspects. Other features will be apparent from the accompanying figures and from the detailed description that follows.

BRIEF DESCRIPTION OF THE DRAWING FIGURES

FIGS. 9, 10, 11, 12 and 13 shows the view of the fork spring structure 600 implemented using one part top for a container.

Other features of the present embodiments will be apparent from the accompanying drawings and from the detailed description that follows.

DETAILED DESCRIPTION OF THE INVENTION

Several product embodiments and method of operating the container top are disclosed. Although the present embodiments have been described with reference to specific example embodiments, it will be evident that various modifications and changes may be made to these embodiments without departing from the broader spirit and scope of the various embodiments.

Figure 1A:
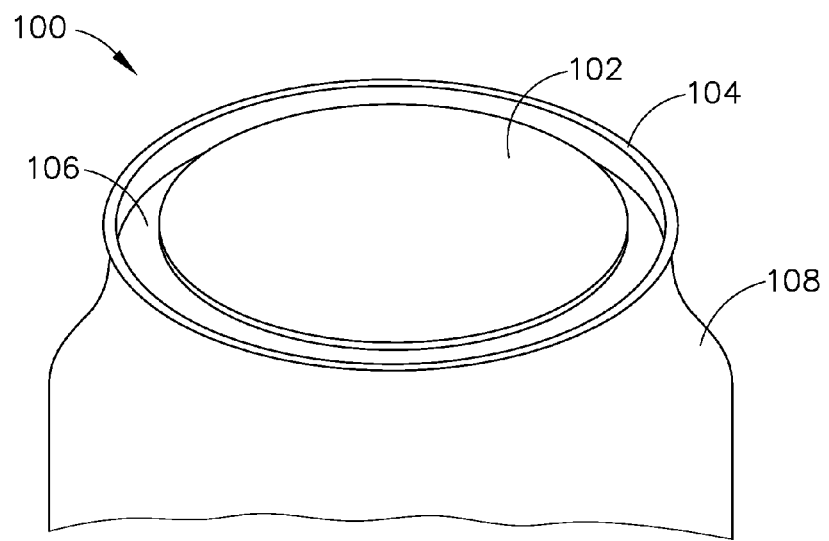
FIGS. 1A and 1B is a top view of the two part top 100 for a container.
Figure 1B:
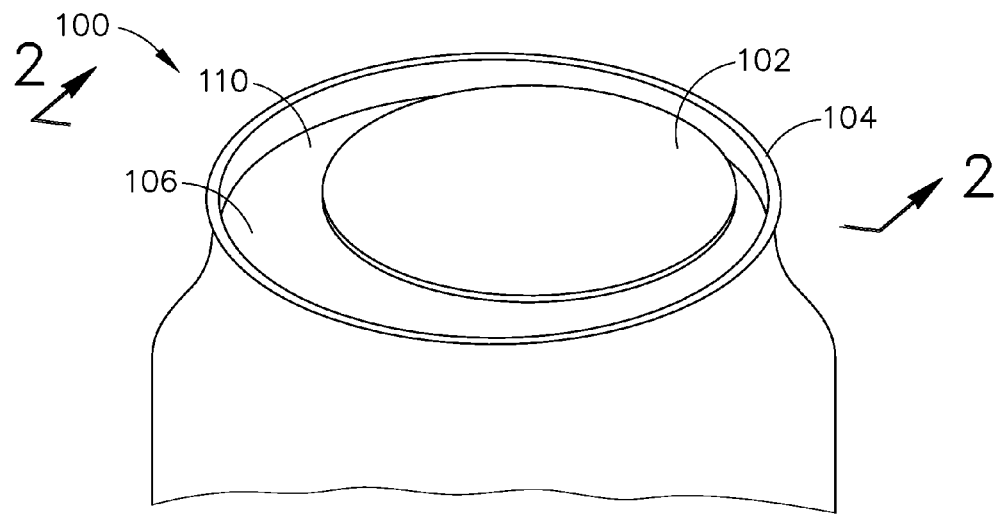

Referring more particularly to the drawings, FIG. 1A is a top view of the two part top 100 with a container. The container 108 has an opening surrounded by a peripheral seam 104, a panel 106 and a light weight hinged top 102. If the container top has an offset then it is shown in FIG. 1B as 110. The container may be a bottle, can, jar or any container that may carry solids, liquid or semisolid. The peripheral seam 104 may be raised or flush with the container 108. The peripheral seam 104 allows the ene two part top 102 or two one part top 500 to seal the container opening by connecting and/or sealing. The one part top 102 and/or two part top 500 may be made up of a metal, biodegradable material and/or any material that can be molded to form the shape. The light weight hinged top may have an offset 110 as shown in FIG. 1B or may not have an offset as shown in FIG. 1A. Further description of the one part top and two part top are described below. The one part top may cover the opening of the container by 100-90%, 90-20% and 80-25%.

Figure 2:
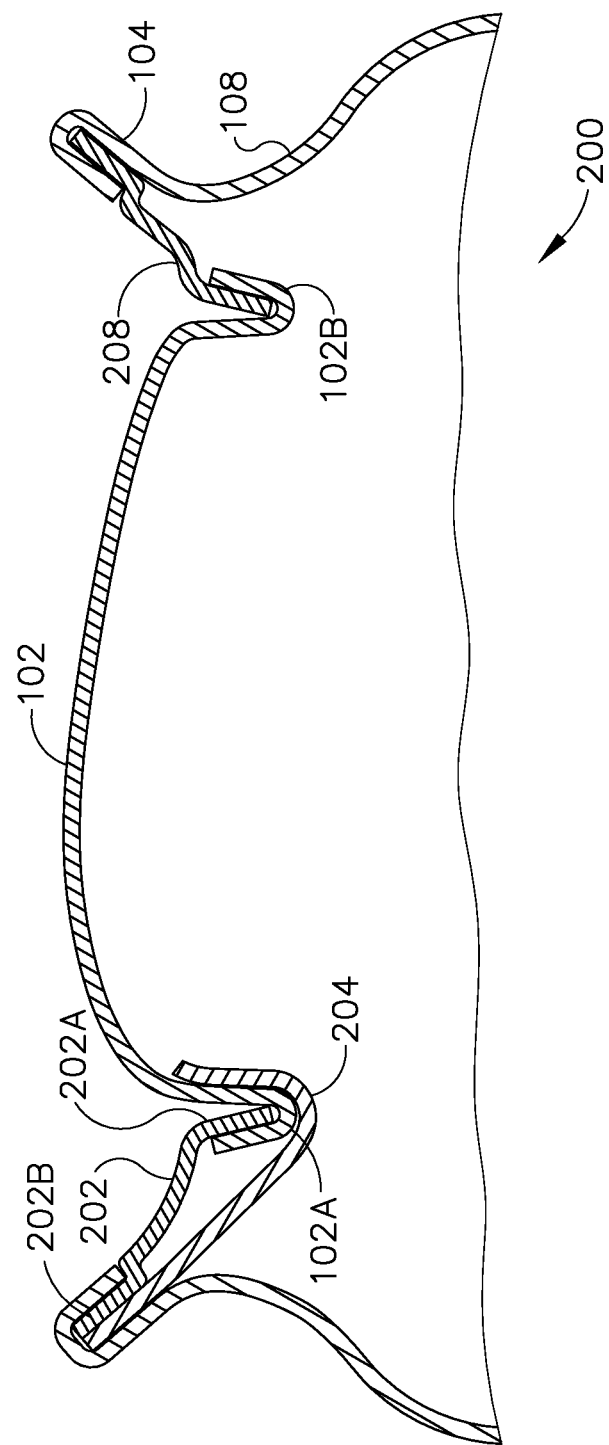
FIG. 2 is a cross-sectional view of the two part top 100 for a container.
Figure 3A:
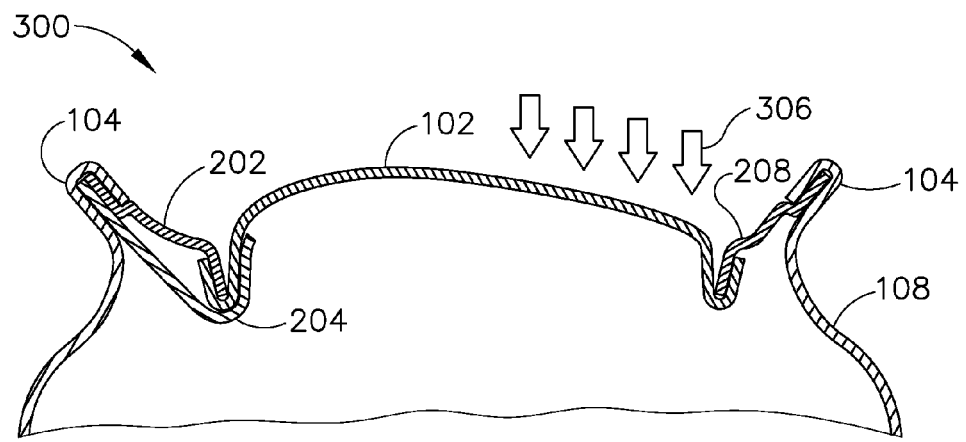
FIGS. 3A, 3B, 3C and 3D shows a mechanism of opening the two part top 100 on a container.
Figure 3B:
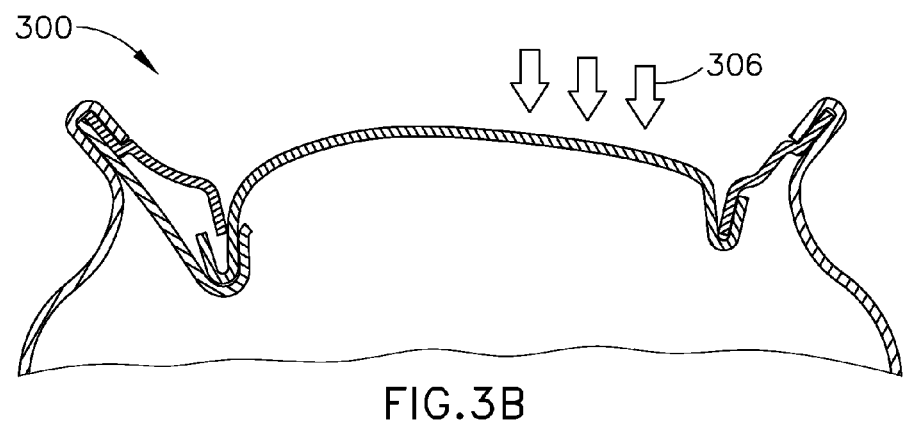
Figure 3C:
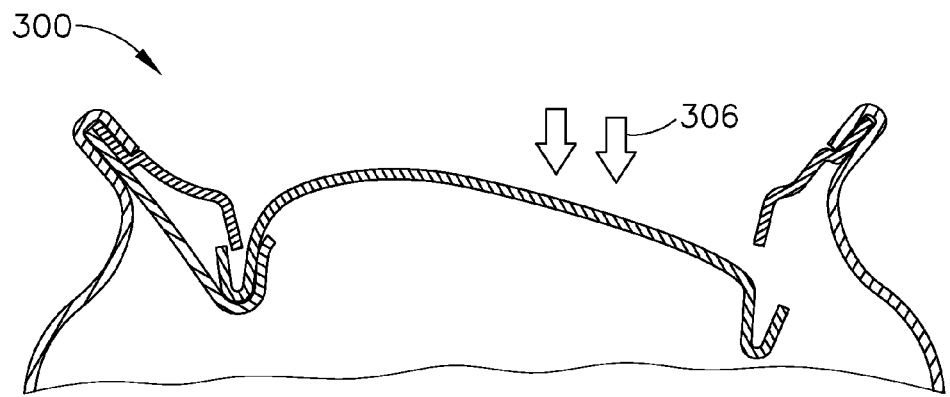
Figure 3D:
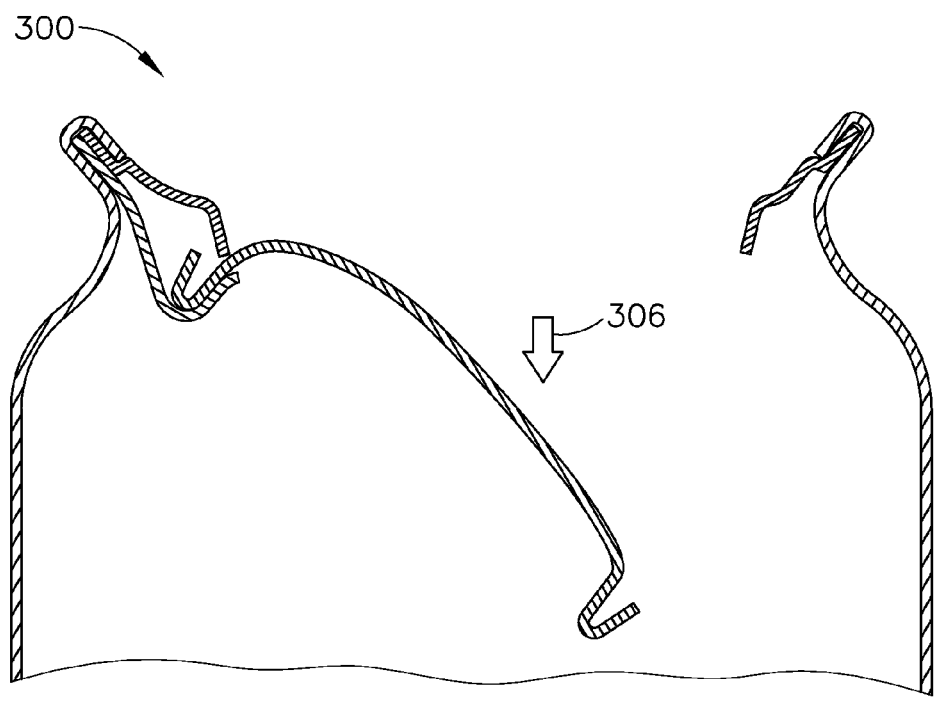

FIG. 2 shows a cross section view of the two part top and container 200. The container 108 has a raised peripheral seam 104 that houses the fork spring 204, guide members 202 and 208 along with light weight hinged top 102. The peripheral seam 104 is curved (convex) and is a tight fit molded part to house various components. The peripheral seam 104 houses the 202B part of the guide member and the other end 202A of the guide member helps in opening and closing of the dome top 102 A convex end and the fork finger 204 convex end. The structure and size of the opening surrounded by the peripheral seam 104 may be as big as the standard soft drink cans or may be as small as a standard bottle top. There is no burden on the current industry to retool or change their manufacturing processes since the instant product is compliant with industry tooling and manufacturing standards. The product design is flexible to scale according to the shape and size of a container.

The guide member 208 is fixed length part and fits snugly with the folded seam 104 on one end (202B) and on the other end 202A provides a guidance path for the light weight hinged top 102 when is in closed position or open position or reseals and/or recloses. The guide member 202 provides the same functionality as the guide member 208 but has additional features. The guide member 202 is housed on one end in a curved convex end 102A of the light weight hinged top 102. The distance and insertion of the guide member 202 and its proximal end 202A is critical to guide the light weight hinged top during opening and closing. It also provides extra support to the fork spring 204. The length of the guide member 202 may vary depending on whether the light weight hinged top has an offset or not. This guide member by having variable length allows the sealing of the container 108 to be more efficient.

FIG. 3 shows a light weight hinged top 102 sealing the container 108 completely. In FIG. 3 A the pressure 306 is being applied on the light weight hinged top 102 (one part top) to open the container top. The fork spring 204 connected side is frangible and the fork spring 204 is lowered to release the junction for the light weight hinged top 102 to severe from the fork spring hinged side in FIG. 3B. In FIG. 3C the opening starts happening on the non fork spring hinged side and the separation happens completely on the peripheral seam 104. Once the separation is complete the fork spring 204 holds the light weight hinged top 102 in place and the light weight hinged top 102 floats in the liquid freely with no attachment to 202 as shown in FIG. 3D. The peripheral seam 104 of the container 108 holds the guide member 202, the fork spring 204 attached to the light weight hinged top 102 in place by using the manufactured curve fit snug. Since the fork spring 204 has three pronged grip (described later) the light weight hinged top 102 stays in place.

Figure 4A:
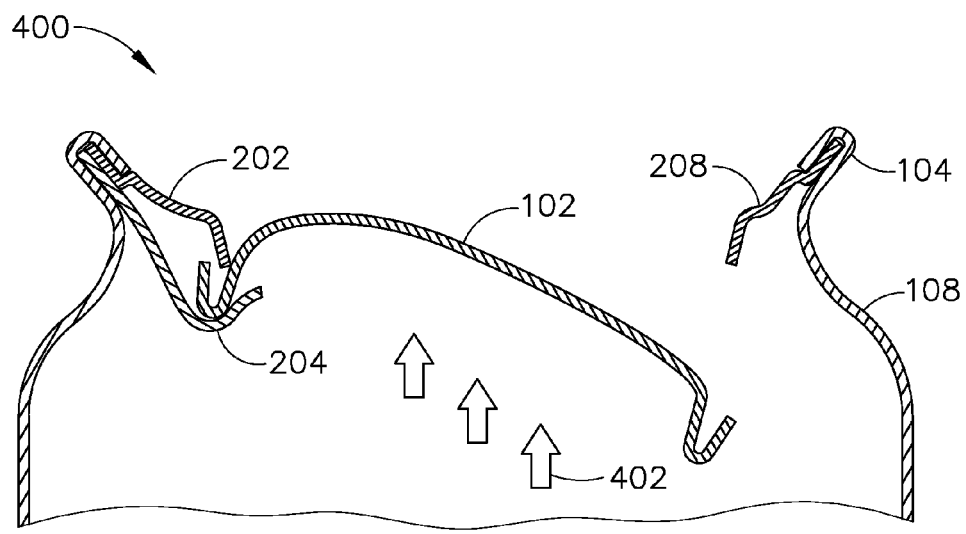
FIGS. 4A, 4B and 4C shows a mechanism of closing the two part top 100 on a container.
Figure 4B:
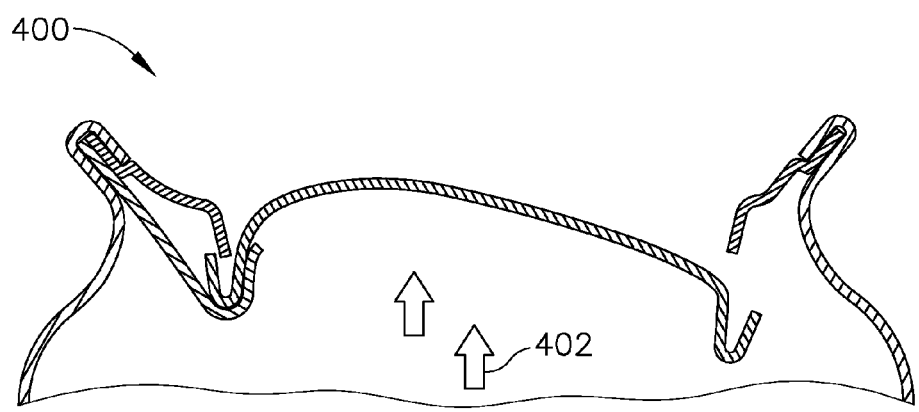
Figure 4C:
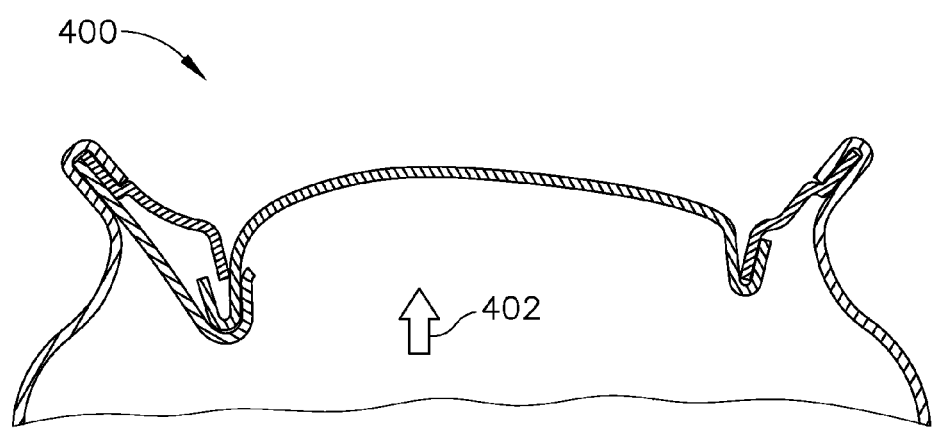
Figure 5:
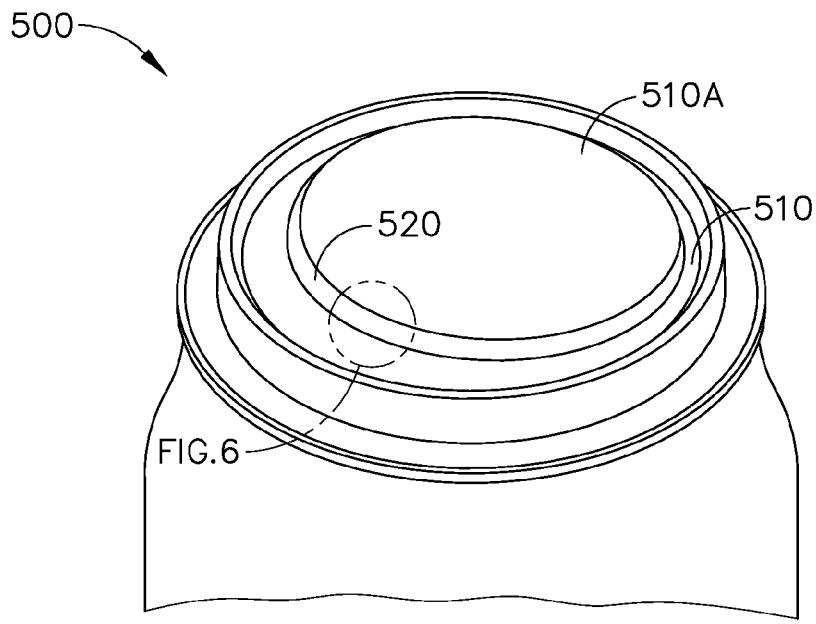
FIGS. 5, 6, 7, 8A, 8B and 8C shows a view of the improved one part top 2500.

FIG. 4 shows the closing of the two part top 400. The pressure 402 is generated by the carbonated beverage once it is opened and the gases try and escape out (FIG. 4A). $CO_2$ pressure is not present until the convex shape dome of the light weight hinged top 102 flange fully re-mates with the guide member 202 and 208 in that order. Until re-mating of the flanges on both sides after opening, pressure 402 is the sole responsibility of the resilient fork spring 204. After flange re-mating the $CO_2$ escapes in a controlled leak (doesn't reseal) which allows the gentle touch of the user's upper lip to easily reopen the light weight hinged top 102. Only by agitating (shaking) the carbonated content can one create excessive $CO_2$ which overwhelms the "controlled leak" and forces the mated flanges further upward into a gas tight seal by force wedge fitting the two flanges together (eliminating the controlled $CO_2$ leak). The rising gases as shown by arrows of 402 lift the light weight hinged top 102 upwards (FIG. 4B). The fork spring 204 helps in retraction of the light weight hinged top 102. The guide member 202 helps guide the upward moving light weight hinged top 102 to align and guide member 208 helps seal the container top on the other end at FIG. 4C. The sealing or tamper proofing may be done using chemical, mechanical or visual methods and may not be limited to just these inspection methods. For example for chemical methods one may use change of color once it is opened or the seal is compromised and one may label that if the color has changed the consumer should be aware that the content of the container 108 may be tampered with. The consumer may also realize that once they open and drink a portion of the drink and want to store the color change on the periphery of the opening may be a good indication that they have to consume that container content first as it has been opened before.

FIGS. 5, 6, 7, 8A, 8B and 8C shows an inverted cross section and the interior view of the one part top 500. One part top 500 is just a variation of two part top 100. The difference is in the way it is sealed with the container 108 and how it opens using two-fold separable seam 510 (inverted flange) that comprises of a curved lip. The curved lip has multiple parts such as the breakaway parts 521, two curved surfaces 522 and 523 beaks with a narrow indentation 524. The one part top inverted flange 510 is a contiguous structure attached to top 510A by joining structure 521. The raised ridge 520 houses the joined structure of 521 and inverted flange 510. One part top inverted flange 510 helps the light weight hinged top 102 to open and reseal the container 108. Once the pressure 515 is applied to the indentation 524 via beaks 522 and 523, the pressure separates bottom of the indentation 524 at 525 and the light weight hinged top 102 is separated along the tear line 525 and the fork spring structure 600 holds the light weight hinged top 102 in place with the help of peripheral seam 104. In this architecture there are is no guide member that aids the opening and closing. While opening, the center finger 616 via its arc when going downward, guides 102 toward the center of the can to aid in tearing the remaining 180 degrees of the tear line until completely open. That is why finger 616 is straight and not curved like 614 & 618. This arc is an important functional necessity. The one part structure two-fold separable seam inverted flange 510 is designed in such a way that it is strong enough to maintain the integrity of the structure.

Figure 6:
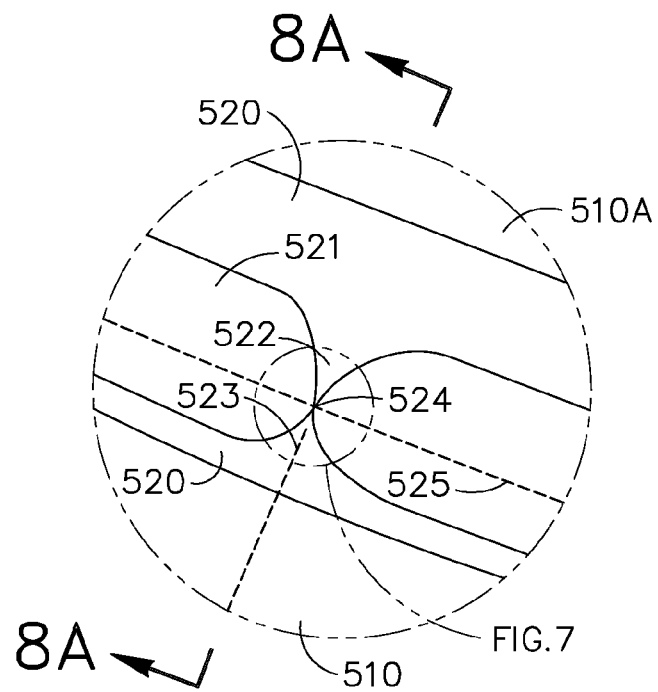
Figure 7:
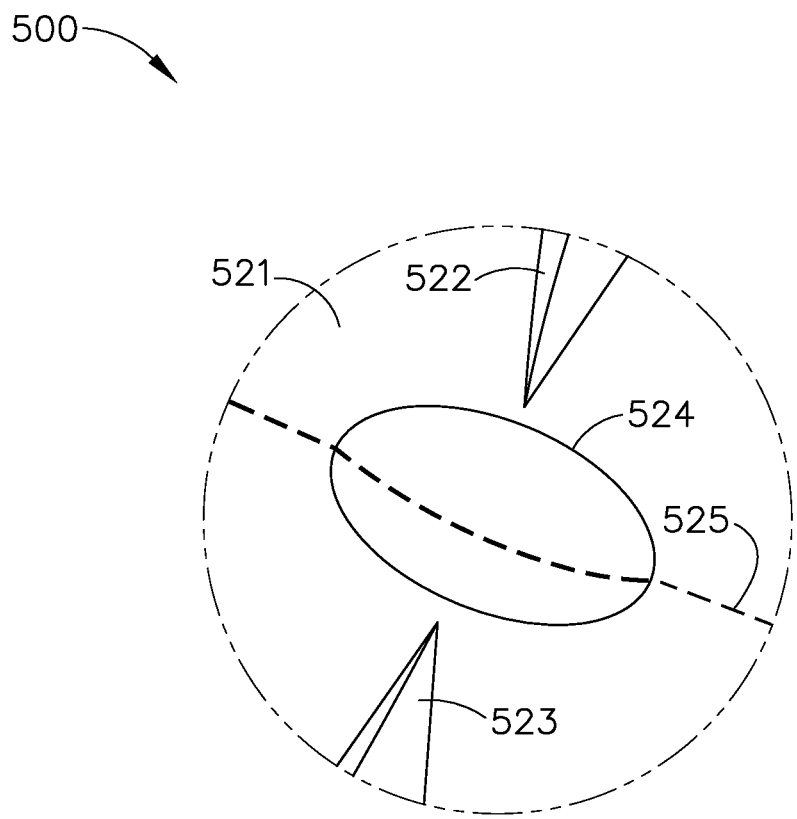
Figure 8A:
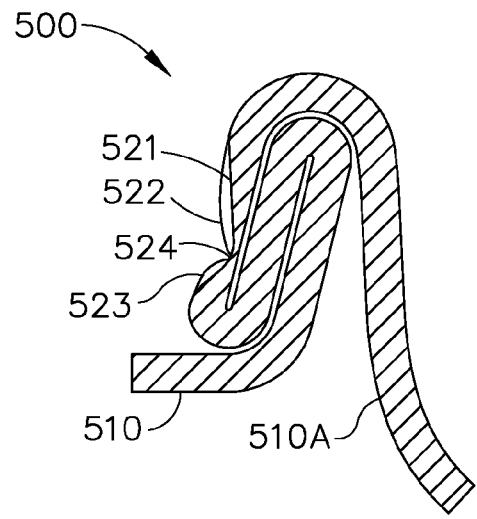
Figure 8B:
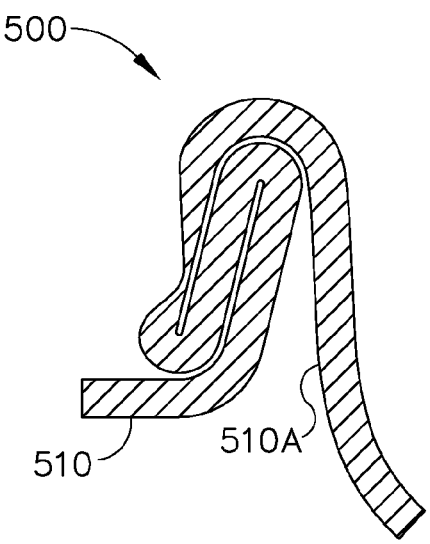
Figure 8C:
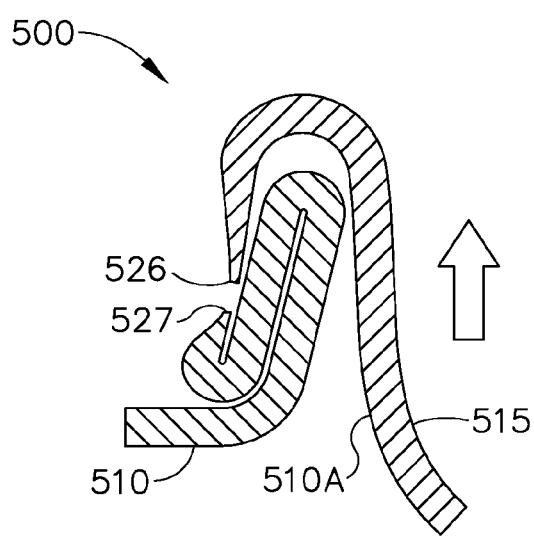
Figure 12:
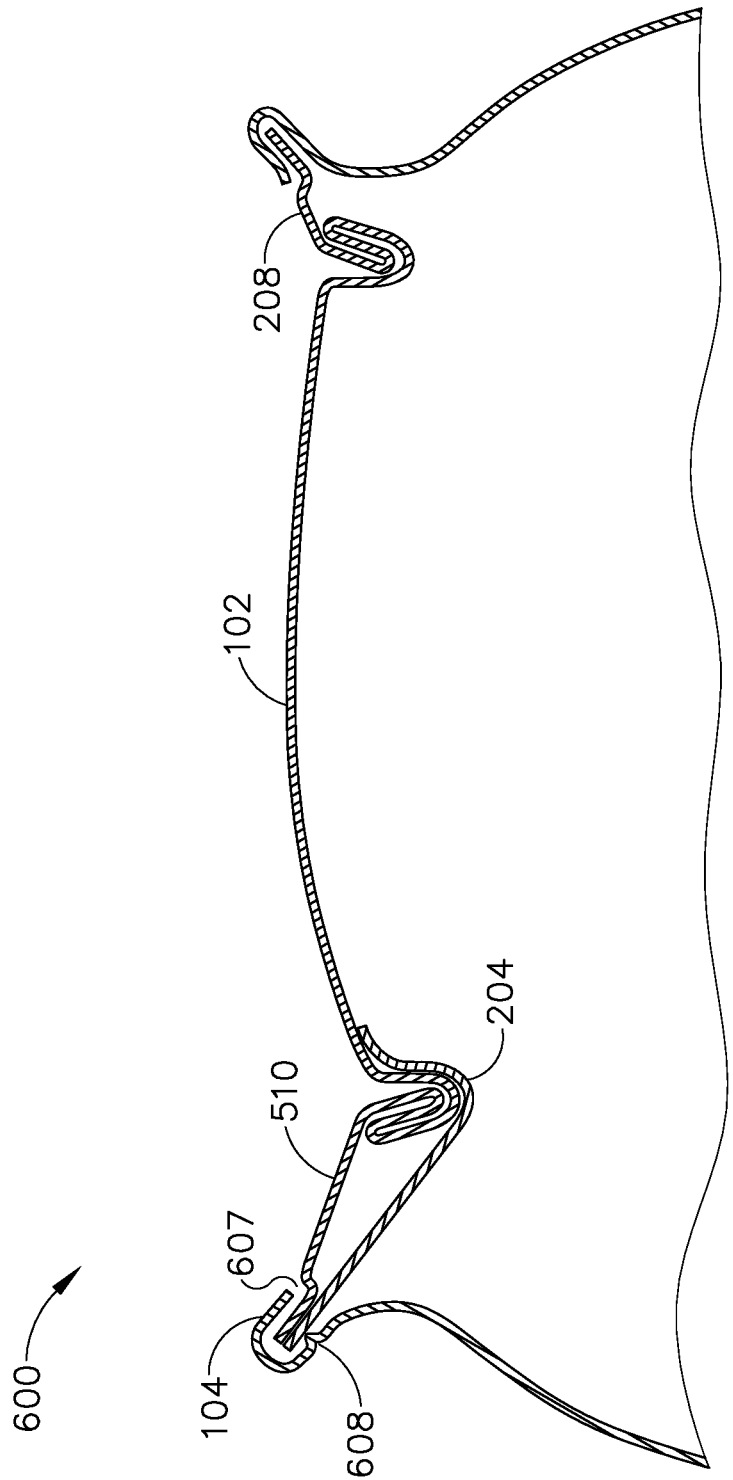
Figure 13:
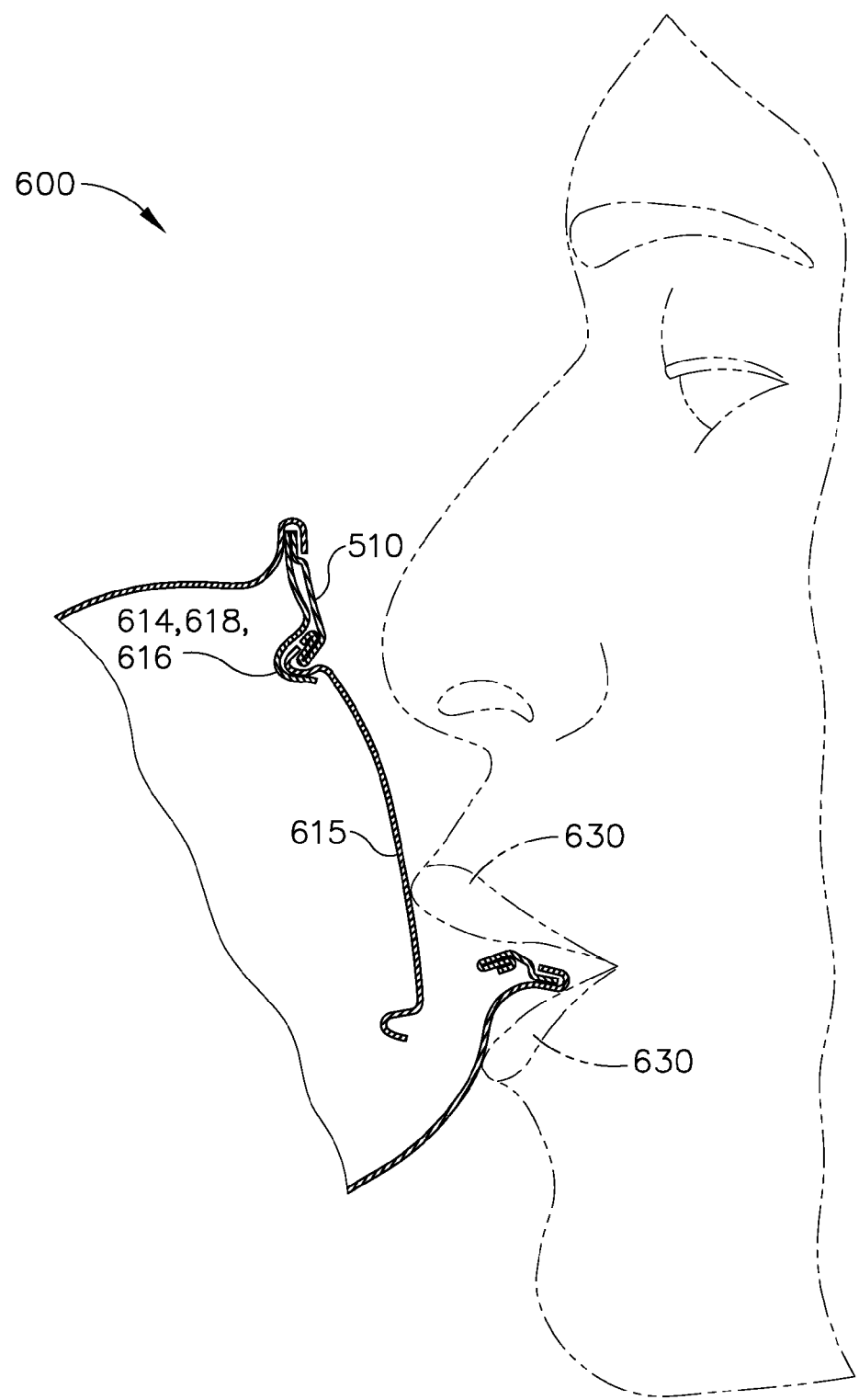

FIGS. 9, 10, 11, 12 and 13 shows the fork spring structure 600 in detail. This feature is an improvement over the pending application. The fork spring structure comprises of the fork spring 204, an attachment section 611. The fork spring 204 has three fingers. The side fingers are 614 and 618 which are shorter than the center finger 616. This design of fork spring 204 enables the structure to either hold or bounce back the light weight hinged top 102 when open and closed. FIG. 6 also depicts a person's lip 630 lowering the light weight hinged top 102 by force and opening the container to consume the content. The pressure of the lip 630 keeps the light weight hinged top 102 open and as soon and the user releases the pressure from the lip 630 the fork spring 204 brings the light weight hinged top 102 back to closed position which effectively recloses the container. The tight design of this junction and the light weight hinged top 102 enables the containers to remain closed/resealed and the contents are kept uncontaminated. The carbonated beverages do not go flat (get decarbonated and taste bad). The instant product and the method of using is novel and consumes less material to manufacture and reduce capital expenses and reduce recycling burden.

Some exemplary methods of use are stated as follows: The container 108 is filled with content of preference such as a carbonated beverage in a can or a bottle. The container is then closed using the light weight hinged top 102 either with two part top 100 or fork spring structure 600. If the container is sealed with two part top 100 then the user just needs to apply pressure using a finger or any instrument to suppress or any other means to apply pressure to lower the light weight hinged top 102. The light weight hinged top 102 then breaks from the cover panel completely and goes horizontally downwards and then slowly becomes angularly situated in inside the container. It is held together by the guide member 202 and fork spring 204. The other side of the light weight hinged top 102 is released by peripheral seam 104 and guide member 208 (convex). Once the sufficient content is consumed and the container is left self closed for some time then pressure 402 created by the carbonation of the beverage would lift the light weight hinged top 102 upwards and with the help of the guide members 208 and 202, and fork spring 204, it is resealed into the same position when it was initially reclosed/sealed. Even if you turn the can (container) up side down the liquid would not spill out.

The container 108 when filled with carbonated beverage of choice the one part top 500 essentially works the same way until resealing. However, the light weight hinged top 102 has a slightly unique breaking point for the start. The user presses the thumb or the finger against the filled container 108 at the dome top area and the junction that contains the two fold two-fold separable seam inverted flange 510. The two-fold separable seam inverted flange 510, which in form of a inverted flange, breaks at its indentation 525 and separates the curved structures 522 and 523 apart to release two-fold separable seam inverted flange 510 from top 510 A. The light weight hinged top 102 is further anchored by fork spring 204. The light weight hinged top 102 may also be used for beverages filled in bottle like structures or bottles.

In addition, it will be appreciated that the light weight hinged top, different design fork springs, and methods of use disclosed herein may be embodied using means for achieving the various combinations of sealing and resealing the container may be achieved. Accordingly, the specification and drawings are to be regarded in an illustrative rather than a restrictive sense.

What is claimed is:

1. A hinged top and a container, comprising:
  a) a container having a top comprising a fixed portion attached to said container at a perimeter thereof, and a frangible, openable portion disposed in an interior portion of the fixed top portion, said frangible, openable portion being surrounded by a two-fold separable seam having an inverted flange; and
  b) a fork spring device comprising a finger like structure having at least two elongated fingers, a proximal end of said fork spring device being attached to a lower surface of said fixed top portion of said container top, each of said at least two elongated fingers having a distal end configured for interactive engagement of at least one selected from the group: said inverted flange, and a lower surface of said frangible, openable portion of said container top.

2. The hinged top and the container of claim 1, wherein said hinged top is a one part top.

3. The hinged top and the container of claim 1, wherein at least one of said at least two elongated fingers of said fork spring device is disposed and configured to help direct at least one operation selected from the group: opening said hinged top, and closing said hinged top.

4. The hinged top and the container of claim 2, wherein said frangible, openable top portion comprises a dome top, said dome top being integrated contiguously with said fixed top portion to form the container top.

5. The hinged top and the container of claim 4, wherein at least one of said at least two elongated fingers is disposed and configured to guide and hold said frangible, openable portion of said one part top while said frangible, openable portion opens and closes in response to an external force applied thereto to open said container for accessing the contents of said container.

6. The hinged top and the container of claim 2, wherein said top comprises a fixed portion panel, a frangible, openable portion and an inverted flange surrounding said frangible, openable portion.

7. The hinged top and the container of claim 4, further comprising: a tear line joining said peripheral seam and said frangible, openable portion to form a one part top prior to initially opening said container.

8. The hinged top and the container of claim 2, wherein said frangible, openable portion covers in the range selected from the group: approximately 20-90%, and approximately 25-80% of a top surface area of said container.

9. A hinged top and a container, comprising:
  a) a container having a top comprising a fixed portion attached to said container at a perimeter thereof, and a frangible, openable portion disposed in an interior portion of the fixed top portion, said frangible, openable portion being surrounded by a two-fold separable peripheral seam having an inverted flange, wherein said hinged top comprises a one part top; and
  b) a fork spring device comprising at least two elongated, resilient fingers, said fork spring device having a proximal end operatively connected to a lower surface of said fixed portion of said top, at least one of said at least two elongated fingers comprises a distal end disposed and configured for interactive engagement with at least one chosen from the group: said two-fold separable peripheral seam, and a bottom surface of said frangible, openable portion to support said frangible, openable portion, wherein at least one of said at least two elongated fingers through said interactive engagement serves to hold said frangible, openable portion of said hinged top in place when said container is opened.

10. The hinged top and the container of claim 9, wherein said frangible, openable portion comprises a dome top, said fork spring device providing a restorative force to close said dome top after an external force is used to open said container for accessing any contents thereof.

11. The hinged top and the container of claim 10, wherein said frangible, openable portion covers in the range selected from the group: approximately 20-90%, and approximately 25-80% of a top surface area of said container.

12. A method of using a container having a resealable hinged top, the steps comprising:
  a) providing a container having a one part top comprising a fixed portion attached to said container at a perimeter thereof, and a frangible, openable portion disposed in an interior portion of the fixed top portion, said frangible, openable portion being surrounded by a two-fold separable peripheral seam having an inverted flange, said frangible, openable portion comprising a dome, and a spring device having at least two elongated fingers, a proximal end of said spring device being operatively connected to an inside surface of said fixed top portion, a proximal end of at least one of said at least two fingers being disposed and configured for interactive engagement with said dome;
  b) applying pressure to said dome to separate said dome of said one part top from said fixed portion of said one part top, wherein at least one of said at least two elongated fingers of said spring device holds said hinged top in place when opened.

13. The method of using the a container having a resealable hinged top, of claim 12, wherein said applying pressure step (b) further comprises the sub-step: using said spring device to guide the opening of said dome.

14. The method of using the container having a resealable hinged top, of claim 13, the steps further comprising:
  c) using a carbonated pressure generated by a content of said container to push said dome top upwards and using said spring device to help correctly align said dome to said fixed portion to accomplish at least one result selected from the group: closing said dome and resealing said dome to said fixed portion.

* * * * *